US005703136A

United States Patent [19]
Gillis et al.

[11] Patent Number: 5,703,136
[45] Date of Patent: *Dec. 30, 1997

[54] POLYMERIC FOAMS

[75] Inventors: Herbert Russell Gillis, West Deptford, N.J.; Dirk Stanssens, Lanaken; Rik De Vos, Rotselaar, both of Belgium; Aaldrik Roelf Postema, Loosdrecht, Netherlands; David Randall, Everberg, Belgium

[73] Assignee: Imperial Chemical Industries plc, London, England

[*] Notice: The term of this patent shall not extend beyond the expiration date of Pat. No. 5,346,928.

[21] Appl. No.: 34,921

[22] Filed: Mar. 19, 1993

Related U.S. Application Data

[63] Continuation-in-part of Ser. No. 830,802, Feb. 4, 1992, abandoned.

[30] Foreign Application Priority Data

Feb. 4, 1991 [GB] United Kingdom ............... 9102362

[51] Int. Cl.$^6$ ............... C08J 9/14; C08J 9/04; C08K 5/01; C08K 5/02
[52] U.S. Cl. ............ 521/128; 521/114; 521/130; 521/131; 521/132; 521/159; 521/163; 521/164; 521/166; 521/172; 521/173
[58] Field of Search ............... 521/114, 128, 521/130, 131, 159, 163, 164, 166, 172, 173, 132

[56] References Cited

U.S. PATENT DOCUMENTS

| | | | |
|---|---|---|---|
| 3,224,983 | 12/1965 | D'Alelio | 521/88 |
| 3,563,937 | 2/1971 | Nickerson | 524/388 |
| 3,663,506 | 5/1972 | Knopf et al. | 524/212 |
| 3,883,466 | 5/1975 | Olstowski | 528/55 |
| 4,033,908 | 7/1977 | Hopkins, Jr. et al. | 521/130 |
| 4,094,827 | 6/1978 | McEntire | 521/129 |
| 4,098,729 | 7/1978 | Kollmeier et al. | 521/128 |
| 4,154,391 | 5/1979 | Girty | 231/3 |
| 4,154,931 | 5/1979 | Richter et al. | 548/317 |
| 4,194,069 | 3/1980 | Speranza et al. | 521/129 |
| 4,568,702 | 2/1986 | Mascioli | 521/130 |
| 4,689,353 | 8/1987 | Harris | 521/159 |
| 4,709,002 | 11/1987 | Younes | 528/53 |
| 4,731,427 | 3/1988 | Younes | 528/53 |
| 4,943,649 | 7/1990 | Magnus et al. | 521/167 |
| 5,079,271 | 1/1992 | Gillis | 521/125 |
| 5,112,879 | 5/1992 | Randall et al. | 521/130 |
| 5,132,040 | 7/1992 | Randall et al. | 521/130 |
| 5,149,458 | 9/1992 | Nodelman | 521/130 |
| 5,238,970 | 8/1993 | De Vos | 521/132 |
| 5,240,965 | 8/1993 | De Vos et al. | 521/132 |
| 5,346,928 | 9/1994 | De Vos et al. | 521/128 |
| 5,356,556 | 10/1994 | De Vos | 521/132 |
| 5,368,769 | 11/1994 | De Vos et al. | 521/131 |
| 5,391,584 | 2/1995 | De Vos | 521/114 |
| 5,393,799 | 2/1995 | De Vos et al. | 521/159 |
| 5,578,656 | 11/1996 | Gillis et al. | 521/166 |

FOREIGN PATENT DOCUMENTS

| | | |
|---|---|---|
| 0834821 | 2/1970 | Canada . |
| 834821 | 2/1970 | Canada . |
| 139212 | 5/1985 | European Pat. Off. . |
| 0139212 | 12/1987 | European Pat. Off. . |
| 1447850 | 6/1966 | France . |
| 2415150 | 10/1975 | Germany . |

*Primary Examiner*—Rabon Sergent

[57] ABSTRACT

A method for the preparation of rigid foams by reacting an organic polyisocyanate with an isocyanate-reactive material in the presence of a blowing promoter characterized in that the isocyanate-reactive material comprises at least one isocyanate-reactive cyclic carbonate or isocyanate-reactive cyclic urea, the reaction being performed in the presence of an inert insoluble organic liquid which is present as the disperse phase of an emulsion or a microemulsion, and in the presence of a metal salt catalyst.

8 Claims, No Drawings

POLYMERIC FOAMS

CROSS REFERENCE TO RELATED APPLICATIONS

The present application is a continuation-in-part of U.S. patent application, Ser. No. 07/830,802, filed Feb. 4, 1992, now abandoned, entitled "Polymeric Foams".

This invention relates to polymeric foams and more especially to rigid polyurethane foams derived from organic polyisocyanates and to methods for their preparation.

The production of foamed materials based on polyurethane and other polymer systems derived from organic polyisocyanate is well established. Depending upon the formulations used in their manufacture, the products can vary in texture from the soft flexible foams used as cushioning materials to the rigid foams used as insulating or structural materials. Similarly, depending upon the amount of blowing agent used, products having densities varying between about 10 and about 1100 kg/m$^3$ can be made.

For more than thirty years, the principal blowing agents used in the production of these foams have comprised water, which reacts with the polyisocyanate to form carbon dioxide, and fully halogenated chlorofluorocarbons, especially trichlorofluoromethane, which vaporise and expand under the influence of the exothermic polymer-forming reaction.

In recent years, however, there has been increasing international concern that chlorofluorocarbons may be destroying the earth's protective ozone layer and there is general agreement that their manufacture and use should be severely restricted. Accordingly, it will be necessary in many foam formulations to replace trichlorofluoromethane, at least in part, by other blowing agents. It is not always feasible to use water as a replacement for chlorofluorocarbons because the urea residues formed by reaction between the polyisocyanate and water can lead to undesirable level of surface friability in the foams.

It is known (Tsuzuki et al, J. Org. Chem., 25, 1009, 1960) that phenyl isocyanate reacts with ethylene carbonate with evolution of carbon dioxide to form an oxazolidone but, hitherto, this reaction has not been utilised in the production of polymeric foams.

It has now been found that the use of certain cyclic carbonates or cyclic ureas as blowing promoter in conjunction with specific catalysts and in the presence of an inert insoluble organic liquid, in isocyanate-based foam formulations provides fine celled rigid polymeric products having improved physical properties.

More particularly, fine celled, open celled rigid foams may be produced, which are of particular interest for vacuum panel applications.

Accordingly, the present invention provides a method for the preparation of rigid foams by reacting an organic polyisocyanate with an isocyanate-reactive material in the presence of a blowing promoter, characterised in that the isocyanate-reactive material comprises at least one isocyanate-reactive cyclic compound of formula:

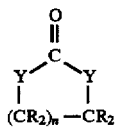

(1)

wherein Y is —O— or —NR$^1$— wherein each R$^1$, independently is a lower alkyl radical of C$_1$–C$_6$, or a lower alkyl radical substituted with an isocyanate-reactive group, wherein each R, independently is H, a lower alkyl radical of C$_1$–C$_6$—, or —(CH$_2$)$_m$— X wherein X is an isocyanate-reactive group which is OH or NH$_2$, and m is 0, 1 or 2; and wherein n is 1 or 2 with the proviso that at least one of R$^1$ or R is or comprises an isocyanate-reactive group, the reaction being performed in the presence of an inert insoluble organic liquid which is present as the dispersed phase of an emulsion or a microemulsion, and in the presence of a metal salt catalyst.

A preferred compound of formula (1) wherein Y is —O— is an isocyanate-reactive cyclic carbonate which is glycerol carbonate.

Preferred compounds of formula (1) wherein Y is —NR$^1$— are isocyanate-reactive cyclic ureas of formula:

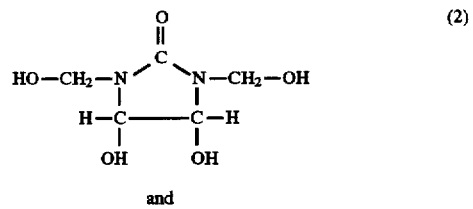

(2)

and

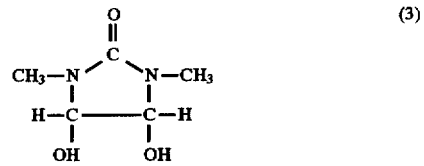

(3)

The insolubility of the inert organic liquid in the reaction mixture usually arises from the fact that it is insoluble in one or more of the major ingredients of the foam formulation, especially the isocyanate-reactive material and/or the polyisocyanate.

Solubility in these materials can be determined by conventional techniques.

The expression "inert" is to be understood as meaning that the organic liquid is chemically inert to the other ingredients of the foam formulation.

Examples of insoluble inert organic liquids include fluorinated compounds, aliphatic, cycloaliphatic or aromatic hydrocarbons.

It is preferred, however, to use as insoluble inert organic liquid a highly fluorinated or perfluorinated compound having a boiling point of at least 40° C. under normal conditions, preferably at least 60° C., more preferably about 80° C. or even above the maximum exotherm temperature of the foaming reaction.

Suitable highly fluorinated or perfluorinated compounds which may be used in the present invention include aliphatic or cycloaliphatic compounds such as alkanes or cycloalkanes which may be substituted or non substituted, cyclic or non cyclic compounds containing at least one O atom, which may be substituted or non substituted—such as fluorinated ethers—, cyclic or non cyclic compounds containing at least one N atom, which may be substituted or non substituted—such as fluorinated amines—, cyclic or non cyclic compounds, containing O and N atoms, which may be substituted or non substituted, such as fluorinated hydroxyl amines, or fluorinated amino-ethers, cyclic or non cyclic compounds containing at least one S atom, which may be substituted or non substituted, such as fluorinated sulfones, for example CF$_3$SO$_2$CF$_3$ and CF$_3$SO$_2$CF$_2$CF$_3$.

Particular examples of highly fluorinated or perfluorinated hydrocarbons include: perfluoronorbornadiene, perfluorodecaline, perfluorodimethylcyclohexane, perfluoromethylcyclohexane, perfluoro-1-methyldecaline, perfluorophenantrene, perfluorodimethylcyclobutane, perfluoropentane, $C_9F_{19}CHF_2$, $C_8F_{18}$, $C_7F_{16}$ and their cyclic derivatives.

Particular examples of highly fluorinated or perfluorinated oxygen containing compounds include: perfluorobutyltetrahydrofuran, perfluoropropyltetrahydrofuran.

Particular examples of highly fluorinated or perfluorinated compounds containing N atoms or N atoms and O atoms include fluorine-containing tertiary amines, for example $(CHF_2)_3N$, $CF_3N(CHF_2)_2$, $(CF_3)_2NC_2F_5$, $CF_3N(C_2F_5)_2$, $(C_2F_5)_3N$, $(CF_3)_2NCF_2CF_2H$, $CF_3CH_2N(CH_3)_2$ and N-methyloctafluoropyrrolidine, fluorine-containing hydrazines, for example $(CF_3)_2NN(CF_3)_2$ or $(CF_3)_2NOCH_3$, $(CF_3)_2NOC_2F_5$,

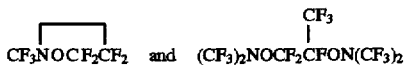

and fluorine-containing amino-ethers, for examples $(CF_3)_2NCF_2CF_2OCF_3$ and most preferably: perfluoro-N-methylmorpholine, perfluorotripentylamine, perfluorotributylamine, perfluorotripropylamine, perfluoro-N-methylpiperidine.

Other suitable fluorinated compounds include the perfluorinated ethers commercialised by Montefluos S.p.A. as Galden® HT200 or Galden® HT230, Galden® HT250, Galden® HT270.

To ensure zero ozone depletion potential, it is preferred to use fluorinated compounds containing no other halogen atoms.

Preferred metal salts catalysts for use in the present invention should be selected among group Ia and group IIa metal salts, more preferably among group Ia and group IIa metal carboxylates.

Particularly suitable catalysts for use in the present invention should be selected among: potassium acetate and potassium ethyl-hexoate.

Organic polyisocyanates which may be used in the method of the invention include aliphatic, cycloaliphatic, araliphatic and aromatic polyisocyanates but especially the polyisocyanates proposed in literature for use in the production of foams. Of particular importance are aromatic diisocyanates such as tolylene and diphenylmethane diisocyanate in the well known pure modified or crude forms. Special mention may be made of the so-called MDI variants (diphenylmethane diisocyanate modified by the introduction of urethane, allophanate, urea, biuret, carbodiimide, uetonimine or isocyanurate residues) and the mixtures of diphenylmethane diisocyanate(s) and oligomers thereof known in the art as "crude" or "polymeric" MDI (polymethylene polyphenylene polyisocyanates).

In performing the method of the invention the polyisocyanate may be reacted with the isocyanate-reactive cyclic carbonate or isocyanate-reactive cyclic urea in the absence or presence of other isocyanate-reactive materials. It is preferred, however, to perform the method of the invention in the presence of other isocyanate-reactive materials.

The nature of the isocyanate-reactive component which may be used in the present invention depends on the type of polymeric product obtained.

Suitable isocyanate-reactive compounds generally include polyols, amines, imines and enamines and mixtures thereof.

For the preparation of rigid foams, suitable isocyanate-reactive compounds, especially polyols, in general have a molecular weight of 62 to 1500 and a functionality of 2–8, especially 3–8.

Polymeric polyols have been fully described in the prior art and include reaction products of alkylene oxides, for example ethylene oxide and/or propylene oxide, with initiators containing from 3 to 8 active hydrogen atoms per molecule. Suitable initiators include polyols, for example glycerol, trimethylopropane, triethanolamine, pentaerythritol, sorbitol and sucrose, and polyamines, for example diamine, tolylene diamine, diaminodiphenylmethane and polymethylene polyphenylene polyamines, and aminoalcohols, for example ethanolamine and diethanolamine, and mixtures of such initiators. Other suitable polymeric polyols include polyesters obtained by the condensation of appropriate proportions of glycols and higher functionality polyols with dicarboxylic acids. Still further suitable polymeric polyols include hydroxyl terminated polythioethers, polyamides, polyesteramides, polycarbonates, polyacetals, polyolefins and polysiloxanes.

Polyamines having a molecular weight below 1000 include aliphatic, cycloaliphatic or araliphatic polyamines containing two or more primary and/or secondary amino groups,—such as the low MW amino-ended polyethers—, and aromatic polyamines such as DETDA.

The substantially insoluble inert organic liquid will usually be incorporated in the foam-forming reaction mixture in the form of an emulsion or preferably a microemulsion in one of the major components, that is to say in the isocyanate-reactive component and/or the polyisocyanate. Such emulsions or microemulsions may be prepared using conventional techniques and suitable emulsifying agents.

Emulsifying agents suitable for preparing stable emulsions or microemulsions of fluorinated liquid compounds in organic polyisocyanates and/or isocyanate-reactive compounds include surfactants chosen from the group of nonionic, ionic i.e. anionic or cationic, and amphoteric surfactants. Preferred surfactants are fluoro surfactants and/or alkoxylated alkanes. Particular examples of fluoro surfactants include: fluorinated alkyl polyoxyethylene ethanols, fluorinated alkyl alkoxylate, fluorinated alkyl esters.

Suitable further blowing agents may be used in the method of the present invention such as $H_2O$ or inert low boiling compounds having a boiling point of above −50° C. at 1 bar.

The amount of water used as blowing agents may be selected in known manner to provide foams of the desired density, typical amounts being in the range from 0.05 to 5 parts by weight per 100 parts by weight of reactive ingredients, although it may be a particular embodiment of the present invention to incorporate up to 10% by wt or even up to 20% by wt of $H_2O$.

Suitable inert blowing agents, include for example hydrocarbons, dialkyl ethers, alkyl alkanoates, aliphatic and cycloaliphatic hydrofluorocarbons, hydrochlorofluorocarbons, chlorofluorocarbons, and fluorine-containing ethers. Suitable hydrocarbon blowing agents include lower aliphatic or cyclic hydrocarbons of such as pentane, iso-pentane, cyclopentane or neopentane, hexane, cyclohexane.

To reduce the number of component streams delivered to the final mixing apparatus, the cyclic carbonate, the catalyst, the inert insoluble organic liquid and optionally the inert volatile blowing agents and other additives, may be premixed with one of the major components of the foam formulation. In particular, when the foam formulation contains a rigid foam polyol, the isocyanate-reactive cyclic compound, for example glycerol carbonate, may be mixed with the polyol to form a useful polyol composition.

Suitable polyol compositions contain from 1 to 99%, preferably from 1 to 60%, of the cyclic isocyanate-reactive compound on a weight basis.

When the inert insoluble organic liquid is added to both the isocyanate-reactive component (polyol composition) and the polyisocyanate composition even finer cell sizes are obtained than when the inert insoluble organic liquid is added only to one of these components. This dual stream approach may yield cell sizes of from 50 to 110 Microns while the single stream would yield cell sizes of from 100 to 160 Microns for the same total amount of inert insoluble organic liquid.

In addition to the ingredients already mentioned, the foam-forming mixture may contain one or more other auxiliaries or additives conventional to isocyanate-based foam formulations. Such optional additives include, further conventional catalysts, fire retardants, smoke suppressants, organic or inorganic fillers, thixotropic agents, dyes, pigments, mould release agents, surfactants, foam stabilisers and the like.

Isocyanate indices of from 70 to 140 will typically be used in operating the method of the invention but lower indices may be used if desired. Higher indices, for example 150 to 500 or even up to 3000, may be used in conjunction with trimerisation catalysts to make foams containing isocyanurate linkages.

The method of the invention may be put into practice making use of conventional techniques. Thus known mixing methods may be used and the foams may be produced in the form of slabstock, mouldings, cavity fillings, sprayed foam, frothed foam or laminates with other materials such as hardboard, plasterboard, paper, plastics or metals. Rigid foams prepared in accordance with the method of the invention are characterised by having open cells and a very fine cell structure. They are of particular use for vacuum panels applications where they show superior thermal insulation properties.

The invention is illustrated but not limited by the following Examples, in which all parts and percentages are by weight.

EXAMPLE 1

A rigid foam of fine cell structure and good insulation property was prepared by using the following formulation:

|  | Parts by weight |
| --- | --- |
| A polyether polyol blend of OH value = 365 | 100 |
| A silicone surfactant | 4.0 |
| $H_2O$ | 2.5 |
| $K^+$ acetate (catalyst) | 2.0 |
| N methyl morpholine (catalyst) | 5.0 |
| A composition commercialised by BASF as Fixapret CNF, containing cyclic urea A | 14.4 |

$$\begin{array}{c} O \\ \parallel \\ C \\ HO-CH_2-N \diagup \quad \diagdown N-CH_2-OH \\ | \qquad\qquad | \\ H-C\text{------}C-H \\ | \qquad\qquad | \\ OH \qquad\quad OH \end{array}$$

| Perfluoropentane | 12.7 |
| --- | --- |
| Polymeric MDI | 183.8 |
| The resultant rigid foam had a density of: | |
| Density (Kg/m$^3$) | 16.5 |

EXAMPLE 2

A rigid foam of fine cell—open cell structure was prepared by using the following formulation:

| A polyether polyol blend of OH value = 365 | 100 |
| --- | --- |
| A silicone surfactant | 4.0 |
| $H_2O$ | 3.2 |
| $K^+$ acetate | 1.8 |
| Glycerol carbonate | 5.25 |
| Perfluoropentane | 16.3 |
| Polymeric MDI | 171 |
| Density (kg/m$^3$) | 26.5 |

EXAMPLE 3

A rigid foam of open cell—fine cell structure and good insulation property was prepared by using the following formulation:

| A polyether polyol blend of OH value = 365 | 100 |
| --- | --- |
| A silicone surfactant | 4.0 |
| $H_2O$ | 2.5 |
| $K^+$ acetate | 1.8 |
| Glycerol carbonate | 5.25 |
| Perfluoro-2-butyl-tetrahydrofurane | 2.00 |
| Polymeric MDI | 156 |
| Closed cell content | 3% |
| Density (kg/m$^3$) | 37.2 |

EXAMPLE 4

A rigid foam of open cell—fine cell structure and good insulation property was prepared by using the following formulation:

| A polyether polyol blend of OH value = 365 | 100 |
| --- | --- |
| A silicone surfactant | 4.0 |
| $H_2O$ | 2.5 |
| $K^+$ acetate | 1.8 |
| A composition commercialised by BASF as Fixapret CNF, containing cyclic urea A | 5.25 |

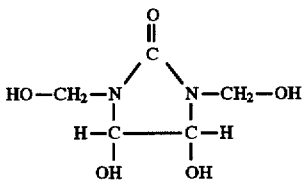

| Perfluoro-2-butyl-tetrahydrofurane | 5.0 |
| --- | --- |
| Polymeric MDI | 156 |
| Closed cell content | 3% |
| Density (kg/m$^3$) | 37.2 |

EXAMPLE 5

Rigid foams of open cell—fine cell structure and good insulation property were prepared by using the following formulations:

| Polyol composition | | |
| --- | --- | --- |
| polyether polyol of OH value 500 | 100 | 100 |
| silicone surfactant | 4 | 4 |
| Fixapret CNF | 2.85 | 2.85 |
| $K^+$ acetate | 1.3 | 1.3 |
| fluoro surfactant | 3 | 1.5 |
| perfluoropentane | 50 | 25 |

-continued

| Polyisocyanate composition | | |
|---|---|---|
| polymeric MDI | 167 | 167 |
| fluoro surfactant | 0 | 1.5 |
| perfluoropentane | 0 | 25 |
| Density (kg/m$^3$) | 37.9 | 38.9 |
| closed cell content | <5% | <5% |
| cell size (mm) | 0.14 | 0.07 |

This example shows that by adding the inert insoluble organic liquid to both the polyol composition and the polyisocyanate composition even finer cell sizes are obtained.

We claim:

1. A method for the preparation of rigid foams by reacting an organic polyisocyanate with an isocyanate-reactive material, characterized in that the isocyanate-reactive material comprises at least one isocyanate-reactive cyclic blowing promoter of the formula:

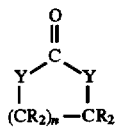

(1)

wherein Y is —O— or —NR$^1$—;

wherein each R$^1$, independently is a lower alkyl radical of $C_1$-$C_6$, or a lower alkyl radical substituted with an isocyanate-reactive group;

wherein each R, independently is H, a lower alkyl radical of $C_1$-$C_6$, or —(CH$_2$)$_m$— X wherein X is an isocyanate-reactive group which is OH or NH$_2$, and m is 0, 1 or 2; and wherein n is 1 or 2 with the proviso that at least one of R$^1$ or R is or comprises an isocyanate-reactive group, the reaction being performed in the presence of an inert insoluble organic liquid which is present as the dispersed phase of an emulsion or a microemulsion and in the presence of a metal salt catalyst, wherein said inert insoluble organic liquid is selected from the group consisting of fluorinated compounds, aliphatic hydrocarbons, cycloalipahtic hydrocarbons and aromatic hydrocarbons.

2. A method according to claim 1, wherein the metal salt is selected from the group consisting of group Ia metal salts and group IIa metal salts.

3. A method according to claim 1, wherein the metal salt is a metal carboxylate.

4. A method according to claim 1 wherein the metal salt is potassium acetate or potassium -2-ethyl-hexoate.

5. A method according to claim 1 wherein the isocyanate-reactive cyclic compound is glycerol carbonate.

6. A method according to claim 1 wherein the isocyanate-reactive cyclic blowing promoter is a cyclic urea of formula:

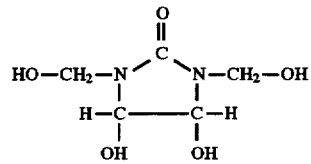

(2)

or

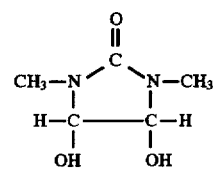

(3)

7. A method according to claim 1 wherein the inert insoluble organic liquid is a highly fluorinated or perfluorinated compound having a boiling point of at least 40° C. selected from the group consisting of perfluoronorbornadiene, perfluorodecaline, perfluorodimethylcyclohexane, perfluoromethylcyclohexane, perfluoro-1-methyldecaline, perfluorophenantrene, perfluorodimethylcyclobutane, perfluoropentane, C$_9$F$_{19}$CHF$_2$, C$_8$F$_{18}$, C$_7$F$_{16}$ and their cyclic derivatives, perfluorobutyltetrahydrofuran, perfluoropropyltetrahydrofuran, fluorine-containing tertiary amines, fluorine-containing hydrazines, fluorine-containing amino-ethers and perfluorinated ethers.

8. A method according to claim 1 wherein the isocyanate-reactive material further comprises a polyol having a MW from 62 to 1500 and a functionality of 2 to 8.

* * * * *